US012597283B2

(12) United States Patent
Norman et al.

(10) Patent No.: US 12,597,283 B2
(45) Date of Patent: Apr. 7, 2026

(54) METHODS AND SYSTEMS FOR GRAPH-INFERENCE-BASED TEXT EXTRACTION FROM UNSTRUCTURED DOCUMENTS

(71) Applicant: Sciome, LLC, Research Triangle Park, NC (US)

(72) Inventors: Christopher Norman, Fagersta (SE); Brian Howard, Raleigh, NC (US); Ruchir Shah, Durham, NC (US)

(73) Assignee: Sciome, LLC, Research Triangle Park, NC (US)

( * ) Notice: Subject to any disclaimer, the term of this patent is extended or adjusted under 35 U.S.C. 154(b) by 426 days.

(21) Appl. No.: 18/454,626

(22) Filed: Aug. 23, 2023

(65) Prior Publication Data

US 2025/0069430 A1 Feb. 27, 2025

(51) Int. Cl.
| | |
|---|---|
| *G06V 30/413* | (2022.01) |
| *G06F 40/205* | (2020.01) |
| *G06T 7/73* | (2017.01) |
| *G06V 10/82* | (2022.01) |
| *G06V 10/94* | (2022.01) |

(Continued)

(52) U.S. Cl.
CPC .......... *G06V 30/413* (2022.01); *G06F 40/205* (2020.01); *G06T 7/73* (2017.01); *G06V 10/82* (2022.01); *G06V 10/95* (2022.01); *G06V 30/1801* (2022.01); *G06V 30/18181* (2022.01); *G06V 30/19173* (2022.01); *G06V 30/42* (2022.01); *G06T 2207/20081* (2013.01); *G06T 2207/20084* (2013.01)

(58) Field of Classification Search
CPC .. G06V 30/413; G06V 30/1801; G06V 10/82; G06V 30/18181; G06V 10/95; G06V 30/45; G06V 30/19173; G06T 7/73; G06T 2207/20081; G06T 2207/20084; G06F 40/205
See application file for complete search history.

(56) References Cited

U.S. PATENT DOCUMENTS

2018/0189269 A1* 7/2018 Quirk ..................... G06N 3/084

OTHER PUBLICATIONS

Riba, Pau, Lutz Goldmann, Oriol Ramos Terrades, Diede Rusticus, Alicia Fornés, and Josep Lladós. "Table detection in business document images by message passing networks." Pattern Recognition 127 (2022): 108641. (Year: 2022).*

(Continued)

*Primary Examiner* — David Perlman
(74) *Attorney, Agent, or Firm* — Muncy, Geissler, Olds & Lowe, P.C.

(57) ABSTRACT

According to one aspect, the subject matter described herein includes a method for extracting text from unstructured documents. The method includes receiving a page of an unstructured document; extracting, from the page, a glyph identifier and a glyph position for each glyph on the page; and generating an adjacency graph based on the glyph positions for each glyph on the page, each node in the graph corresponding to a glyph and comprising glyph information that includes at least the glyph identifier and the glyph position for the respective glyph. The method further includes processing the adjacency graph by a machine learning model to classify edges and nodes in the adjacency graph, then grouping the glyphs according to their edge and node classifications to produce text output.

20 Claims, 14 Drawing Sheets

(51) Int. Cl.
    *G06V 30/18*       (2022.01)
    *G06V 30/19*       (2022.01)
    *G06V 30/42*       (2022.01)

(56)             References Cited

OTHER PUBLICATIONS

Gemelli, Andrea, Sanket Biswas, Enrico Civitelli, Josep Lladós, and Simone Marinai. "Doc2graph: a task agnostic document understanding framework based on graph neural networks." In European Conference on Computer Vision, pp. 329-344. Cham: Springer Nature Switzerland, 2022. (Year: 2022).*
Hassan, Tamir. "Object-level document analysis of PDF files." In Proceedings of the 9th ACM symposium on Document engineering, pp. 47-55. 2009. (Year: 2009).*
Wang, Jilin, Michael Krumdick, Baojia Tong, Hamima Halim, Maxim Sokolov, Vadym Barda, Delphine Vendryes, and Chris Tanner. "A graphical approach to document layout analysis." In International Conference on Document Analysis and Recognition, pp. 53-69. Cham: Springer Nature Switzerland, 2023. (Year: 2023).*

* cited by examiner

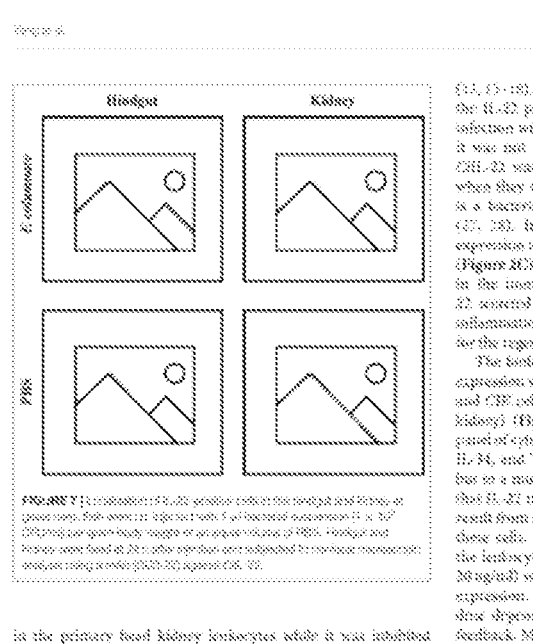
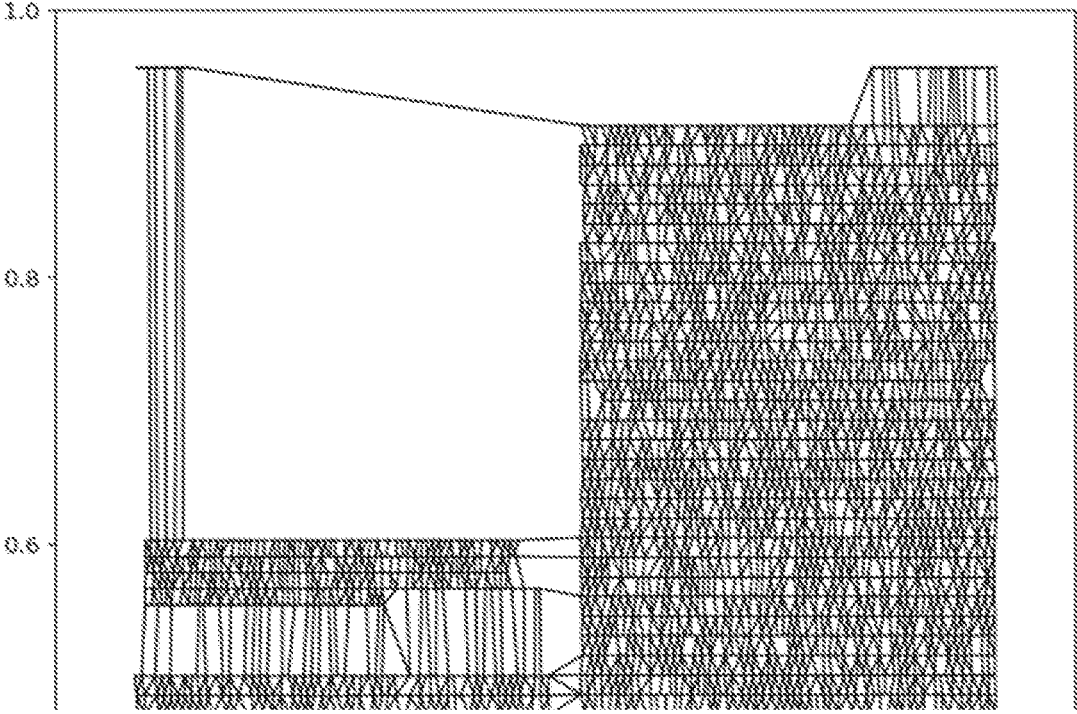
FIG. 4A
FIG. 4B

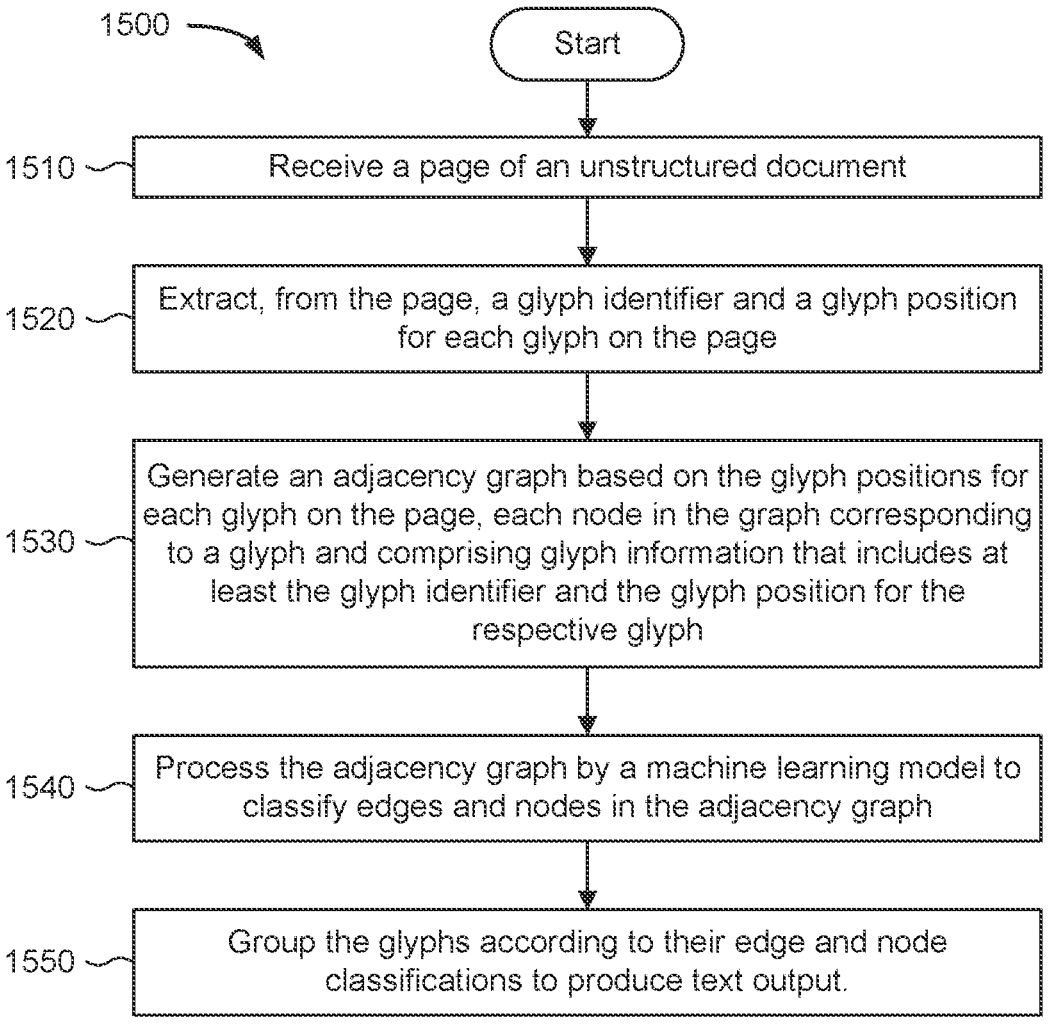

1500

Start

1510 — Receive a page of an unstructured document

1520 — Extract, from the page, a glyph identifier and a glyph position for each glyph on the page 1530 — Generate an adjacency graph based on the glyph positions for each glyph on the page, each node in the graph corresponding to a glyph and comprising glyph information that includes at least the glyph identifier and the glyph position for the respective glyph 1540 — Process the adjacency graph by a machine learning model to classify edges and nodes in the adjacency graph 1550 — Group the glyphs according to their edge and node classifications to produce text output.

*FIG. 15*

METHODS AND SYSTEMS FOR GRAPH-INFERENCE-BASED TEXT EXTRACTION FROM UNSTRUCTURED DOCUMENTS

BACKGROUND OF THE DISCLOSURE

1. Field of the Disclosure

This disclosure relates to techniques that may be used to extract text contained within unstructured documents in a manner that accurately reconstructs the original content and text flows. More specifically, it relates to methods and systems for efficient and accurate text extraction from unstructured documents.

2. Description of the Related Art

The portable document format (PDF) is a file format used to present documents in a manner independent of application software, hardware, and operating systems. Each PDF file encapsulates a complete description of a fixed-layout flat document, including the text, fonts, graphics, and other information needed to display it. Released as an open and royalty-free standard in 2008, it has become a de-facto format for publication of documents intended for global distribution, such as scientific, technical, and scholarly papers, in large part because storing articles in the PDF format provides a uniform way to view and print data.

PDF is based on PostScript, which is a page description language that is used to generate text layout and graphics. Like PostScript, PDF can describe page elements in any arbitrary order—i.e., not necessarily in the "left to right, top to bottom" order in which many languages are read. As a result, while PDF documents visually display text flow readable by humans, the stored text objects within the PDF file are not ordered, which is to say that they are not necessarily described in the order that the objects will be read by the reader, a characteristic that is herein referred to as "unordered". PDF files, PostScript files, and other PDL file formats, to name a few, are "unordered" text files. This creates a challenge for systems to automatically extract the data for use in analyses such as text-mining. Scientific articles, for example, are often presented in a multi-column format, which poses even more challenges to correctly order the text. Tables, figures, and inline citations are also features of scientific and other documents. These features may disrupt the flow of the main body of text, which raises even more challenges.

Thus, there is a need for methods and systems that can accurately and efficiently reconstruct text flows for simple to complex, multi-column page layouts.

SUMMARY

The subject matter described herein addresses each of the problems posed by various obstacles in text flow by using a novel method that parses PDF files by treating parsing steps as graph inference problems. Such a method allows for accurate column detection, both in multi-column articles and tables, as well as identification of titles, abstracts, author information, journal and publication metadata, captions, tables, text blocks, etc. Methods, systems, and computer program products for extracting text from unstructured documents are herein provided.

According to one aspect, the subject matter described herein includes a method for extracting text from unstructured documents. The method includes receiving a page of an unstructured document, extracting, from the page, a glyph identifier and a glyph position for each glyph on the page, and generating an adjacency graph based on the glyph positions for each glyph on the page, each node in the graph corresponding to a glyph and comprising glyph information that includes at least the glyph identifier and the glyph position for the respective glyph. The method also includes processing the adjacency graph by a machine learning model to classify edges and nodes in the adjacency graph, and grouping the glyphs according to their edge and node classifications to produce text output.

According to another aspect, the subject matter described herein includes an apparatus for extracting text from unstructured documents. The apparatus includes a memory and at least one processor communicatively coupled to the memory. The at least one processor configured to receive a page of an unstructured document, extract, from the page, a glyph identifier and a glyph position for each glyph on the page, and generate an adjacency graph based on the glyph positions for each glyph on the page, each node in the graph corresponding to a glyph and comprising glyph information that includes at least the glyph identifier and the glyph position for the respective glyph. The at least one processor is further configured to process the adjacency graph by a machine learning model to classify edges and nodes in the adjacency graph, and group the glyphs according to their edge and node classifications to produce text output.

The subject matter described herein for efficient and accurate text extraction from unstructured documents may be implemented in hardware, software, firmware, or any combination thereof. As such, the terms "function" or "module" as used herein refer to hardware, software, and/or firmware for implementing the feature being described.

In one exemplary implementation, the subject matter described herein may be implemented using a computer readable medium having stored thereon executable instructions that when executed by the processor of a computer control the computer to perform steps. Exemplary computer readable media suitable for implementing the subject matter described herein include disk memory devices, chip memory devices, programmable logic devices, application specific integrated circuits, and other non-transitory storage media. In one implementation, the computer readable medium may include a memory accessible by a processor of a computer or other like device. The memory may include instructions executable by the processor for implementing any of the methods described herein. In addition, a computer readable medium that implements the subject matter described herein may be located on a single device or computing platform or may be distributed across multiple physical devices and/or computing platforms.

BRIEF DESCRIPTION OF THE DRAWINGS

The accompanying drawings are presented to aid in the description of various aspects of the disclosure and are provided solely for illustration of the aspects and not limitation thereof.

FIG. 4A illustrates a portion of the page in FIG. 3A in more detail.

FIG. 4B illustrates the corresponding portion of the approximate adjacency graph in FIG. 3B in more detail.

FIG. 15 is a flowchart of an example graph-based process for text extraction from unstructured documents, according to aspects of the disclosure.

DETAILED DESCRIPTION

Figure 1:
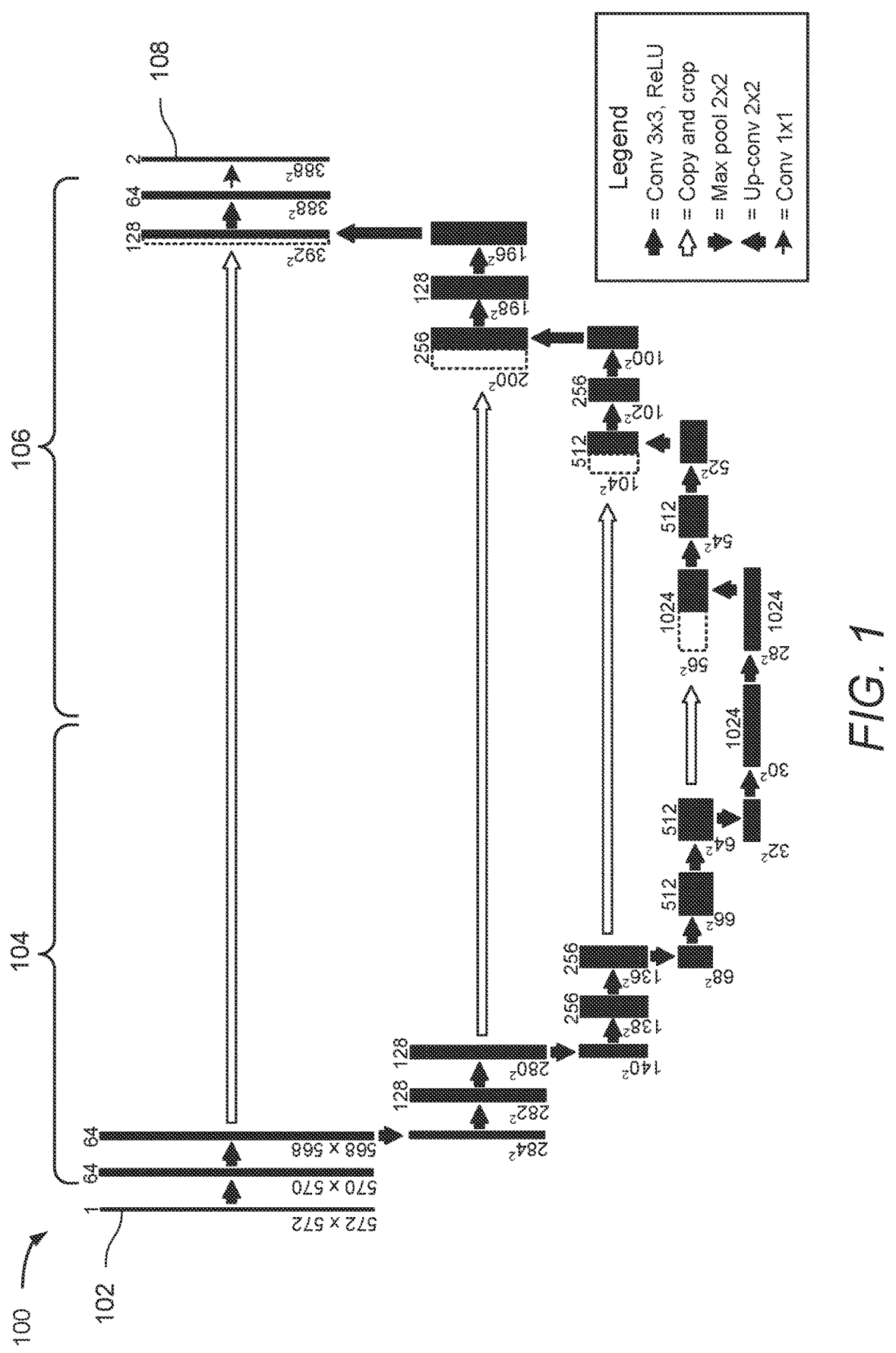
FIG. 1 illustrates a conventional neural network model used for conventional, pixel-based classification of text in a PDF file.

According to one aspect, the subject matter described herein includes a method for extracting text from unstructured documents. The method includes receiving a page of an unstructured document; extracting, from the page, a glyph identifier and a glyph position for each glyph on the page; and generating an adjacency graph based on the glyph positions for each glyph on the page, each node in the graph corresponding to a glyph and comprising glyph information that includes at least the glyph identifier and the glyph position for the respective glyph. The method further includes processing the adjacency graph by a machine learning model to classify edges and nodes in the adjacency graph, then grouping the glyphs according to their edge and node classifications to produce text output.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A conventional approach to extracting and classifying text in a PDF document is to convert each full PDF page into an image and label (i.e., classify) each pixel in the image as either belonging to a text block of not belonging to a text block, e.g., using a trained off-the-shelf model such as UNet or ResNet.

FIG. 1 illustrates a conventional UNet model 100 that uses an input image tile 102 as an input, uses a set of convolution and pooling steps 104, followed by a set of up-conversion and convolution steps 106, to produce an output segmentation map 108. The segmentation map 108 indicates, for each pixel, how the pixel was classified, e.g., as text, image, or whitespace, as body, header, or footer, etc.

Figure 2:
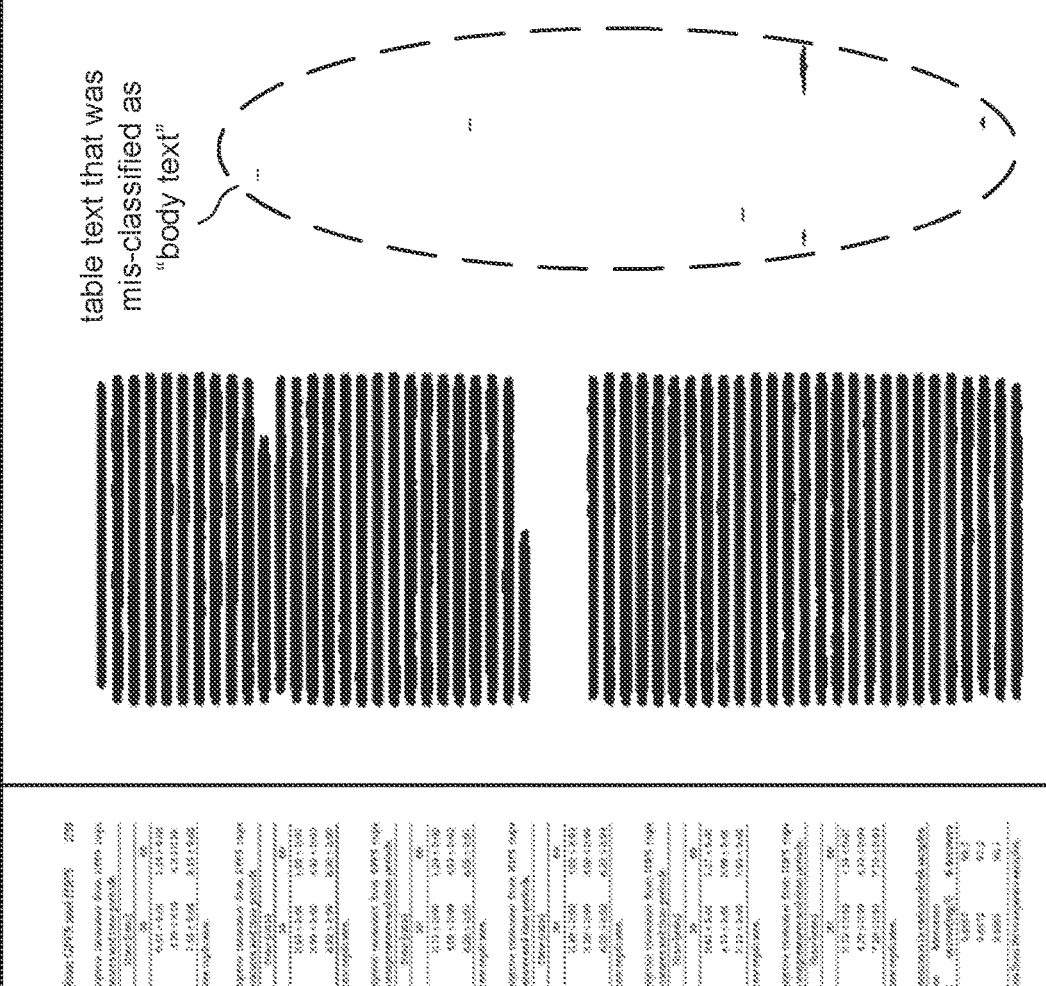
FIG. 2 shows the result of a conventional approach that uses pixel classification.

FIG. 2 shows the result of a conventional approach that uses pixel classification, with the input on the left and the output on the right. In this example, some of the table text was mis-classified as body text. As can be seen in FIG. 2, the conventional approach that uses pixel classification has some weaknesses that result in improper classification of elements, including false positives for classification as body text.

Improved Solution

In contrast to the conventional image-based approach, methods and systems for parsing PDF files by treating parsing steps as graph inference problems are herein presented. As will be explained in detail below, this technique results in very accurate column detection, both in multi-column articles and tables. In addition, novel methods to more accurately solve the PDF parsing problems framed as graph inference problems are also presented, including graph inference approaches.

In some implementations according to aspects of the disclosure, multiple PDF parsing problems may be performed using a single, large, deep learning model. This has the advantage that it allows simultaneous regularization and constraints optimization across problems. For example, performing line segmentation and structural tagging separately may result in solutions that violate shared constraints, such as lines tagged as both header and body text, while performing both functions together can avoid such violations.

In the following examples, the input is a PDF document comprising multiple pages, where each page comprises a number of glyphs (characters) located in different locations on the page. Every glyph is associated with a bounding box that defines a rectangular frame which encompasses the glyph. Each bounding box can be represented by a set of X-Y coordinates that represent the geographic center of the bounding box. Each set of X-Y coordinates thus represents a point on the page. The set of points, which will be referred to herein as set V, are the nodes (also called vertices) in a graph.

From the set of nodes V, a graph G having a set of edges E can be constructed such that two nodes are connected in G if an unobstructed line can be drawn between their respective bounding boxes. A graph G having nodes that meet this requirement is referred to as an adjacency graph. Where the adjacent graph represents glyphs on a PDF page, such a graph is referred to as the adjacency graph of the PDF page.

In some aspects, the adjacency graph G=(V,E) may be constructed by the following algorithm:

```
let E be an empty set of edges;
for each node u in the set of nodes V:
    for each node v in V for which v ≠ u:
        any_intersecting = false;
        for each node w in V for which w ≠ u, w ≠ v:
            if node w intersects any line from u to v:
                any_intersecting = true;
        if not any_intersecting:
            add (u,v) to E;
return E
```

In some aspects, the operation "for each node w in V . . . " can be implemented efficiently using spatial indexing, for an overall $O(n^2 \log n)$ time complexity.

Approximate Adjacency Graphs

In some aspects, an approximate adjacency graph may be generated by calculating the Delaunay triangulation of V in $O(n^2)$ time complexity. This procedure may miss edges useful for further analysis, but such missed edges may be added manually using heuristics. In practice, the approximate adjacency graph will contain fewer edges, but still span the entirety of V, which helps inference.

Figures 3A, 3B:
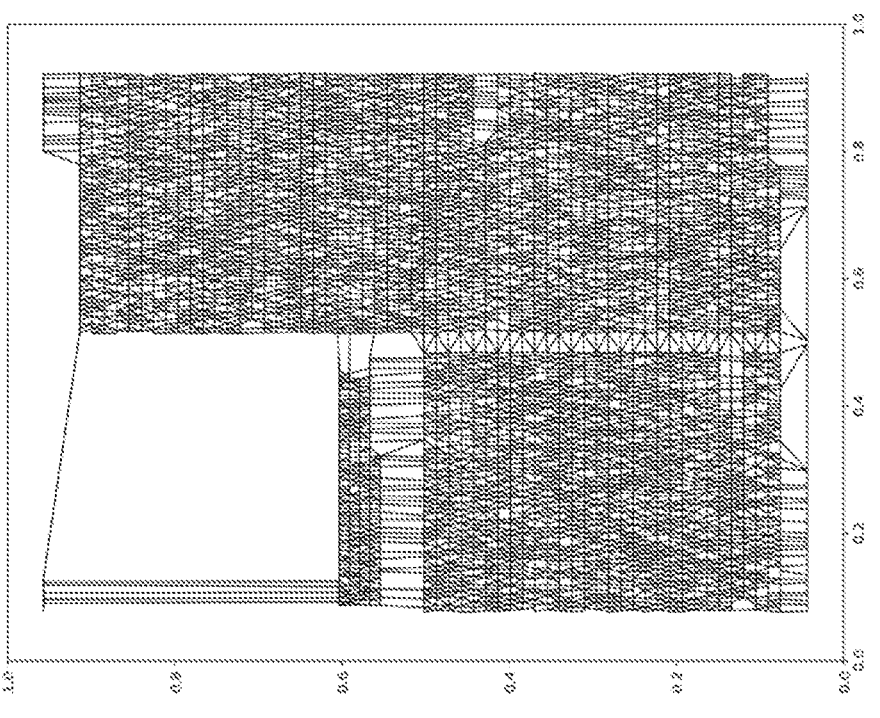
FIG. 3A illustrates an example page from a PDF document.
FIG. 3B illustrates the resulting approximate adjacency graph that was generated from the example page in FIG. 3A, according to aspects of the disclosure.

FIG. 3A illustrates an example page from a PDF document, and FIG. 3B illustrates the resulting approximate adjacency graph that was generated by the Delaunay triangulation method, according to aspects of the disclosure. Because basic adjacency graph algorithms tend to produce many more edges than are necessary or useful for inference—particularly between adjacent lines—some culling of edges is beneficial to remove redundant edges and/or reduce the size of the graph. In some aspects, culling may target edge pairs having the least angles, and/or edges spanning the greatest distance. Moreover, the Delaunay triangulation method tends to miss some useful edges, such as edges between different glyphs having identical X or Y coordinates, which are often structurally related. Thus, in some aspects, missed or skipped edges may be added horizontally or vertically.

FIG. 4A illustrates a portion of the page in FIG. 3A in more detail, and FIG. 4B illustrates the corresponding portion of the approximate adjacency graph in FIG. 3B in more detail.

Semantic Segmentation as a Node Classification Problem

In some aspects, structural tagging can be defined as the problem of assigning discrete classes to each glyph in a PDF page, e.g., from a list of categories representing the glyph's role in the document. In some aspects, for example, this list may include the roles of header, footer, title, metadata, footnote, text, table, and caption. In some aspects, one or more categories may include one or more subcategories. For example, the metadata category may include subcategories such as author name, publication date, and so on. These examples of categories are illustrative and not limiting.

Starting with the graph G, such as the graph illustrated in FIG. 3B and FIG. 4B, for example, the positions of each glyph are given by V: graph-based machine learning methods, e.g., graph convolutions, may then be used to solve the structural tagging problem by treating it as a node classification problem. For example, input features for each node may be gathered from several sources, including the coordinates of the glyph's position on the page, page number, font characteristics (typeface, style, color, font size), or features extracted from the PDF image.

In some aspects, regularization may be performed by jointly training semantic segmentation and blocks. For example, in some aspects, the output may be regularized by realizing that if two adjacent nodes belong to the same block, then they should be assigned the same structural label. Therefore, in some aspects, a penalty may be added to the loss function proportional to number of edges violating this constraint. In some aspects, the output may be regularized by outputting the assignment of blocks and structural labels which optimize both constraints simultaneously.

Figure 5:
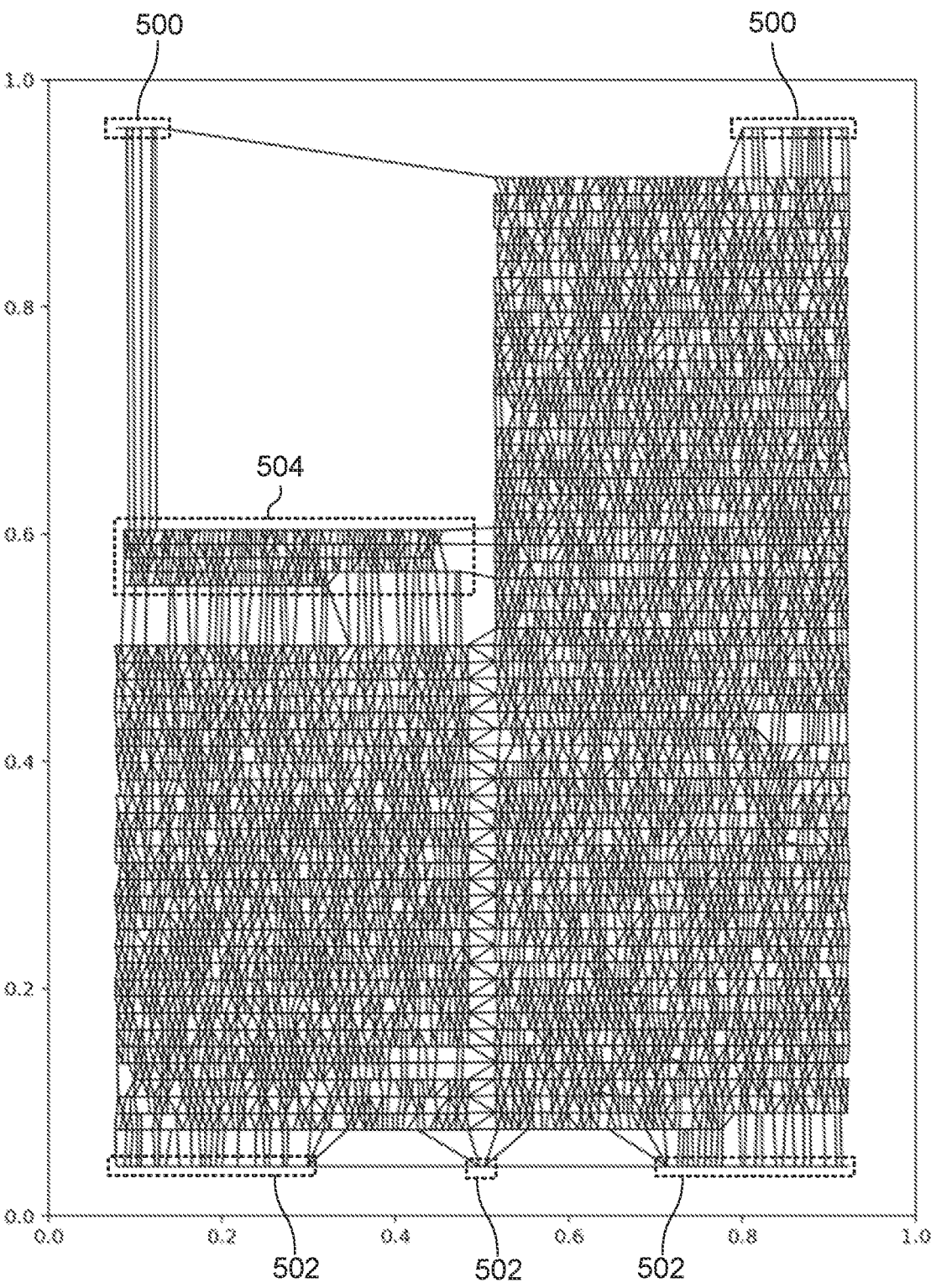
FIG. 5 illustrates an example result of structural tagging using a graph-based approach, according to aspects of the disclosure.

FIG. 5 illustrates an example result of structural tagging using a graph-based approach, according to aspects of the disclosure. In this example, portions of the graph have been identified as being a header part 500, a footer part 502, or a caption part 504, and all other nodes classified as body text.

Attentive DAG-LSTM

A long short-term-memory (LSTM) neural net is an artificial neural network that has feedback connections. Such a recurrent neural network (RNN) can process sequences of data, and has both short term memory (activation patterns in the network change once per time step) and long term memory (connection weights and biases in the network change as a result of training). A "long short-term-memory" architecture is a variant of RNN that aims to provide a short-term memory for RNN that can last hundreds or thousands of time steps.

In some aspects, an attentive algorithm with a long short-term memory (LSTM) variant is applied to general graphs. Since LSTMs have directions, this solution is restricted to directed graphs. Moreover, for the LSTM to terminate, the graph must by acyclic. Therefore, this method may be applied to a directed acyclic graph (DAG). Such constraints do not cause any loss of generality since any undirected graph can be turned into a set of one or more DAGs.

In some aspects, the DAG-LSTM is based on a child-sum tree (CST) LSTM, but with the additional modification that, in order to avoid exploding gradients and consequent not-a-number (NaN) values during training, some of the intermediate summation operations are normalized.

To overcome the deficiencies of the conventional CST LSTM mode, and specifically to make the model better at combining information, in some aspects, an attention mechanism is added to the input summation. Additional improvements to the CST LSTM were also made. For example, the standard CST LSTM model simply averages the input from each inbound edge. In some aspects, the DAG-LSTM combines the input for each inbound edge by taking the weighted average, with weights derived by scaled dot product attention, e.g.:

$$A_t = \left(Q(h_{t-1}) \odot W^{(f)}(x_t)\right)/sqrt(\text{hidden}_{size})$$

where Q: $\text{hidden}_{size} \rightarrow \text{hidden}_{size}$ is a fully connected layer, and A is soft-maxed over all children. This attention mechanism can attend to individual hidden units separately and is therefore able to combine different information from different inbound nodes.

Figure 6:
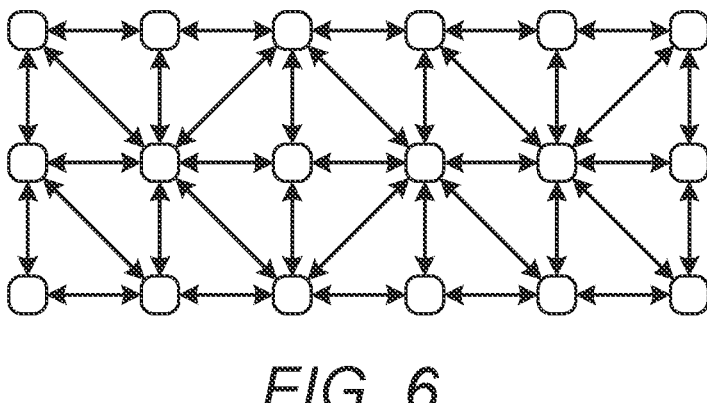
FIG. 6 illustrates an undirected graph generated from a PDF page, according to aspects of the disclosure.

FIG. 6 illustrates an undirected graph, i.e., one in which case every edge between nodes is bidirectional, generated from a PDF page, according to aspects of the disclosure. This graph contains cycles, and there is therefore no topological ordering of the nodes on which to perform an LSTM update.

Figure 7A:
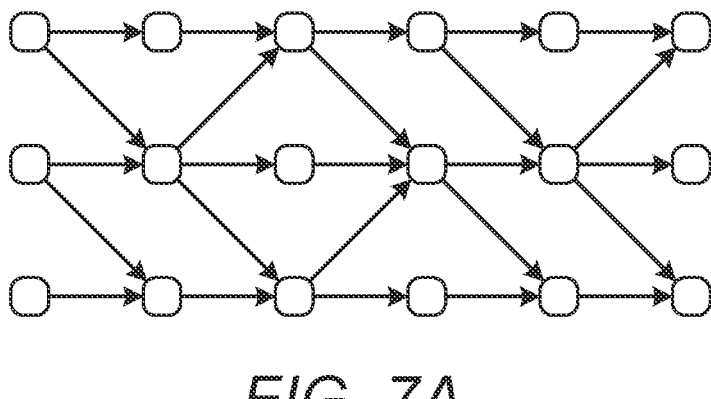
FIG. 7A and FIG. 7B illustrate directed graphs, according to aspects of the disclosure.
Figure 7B:
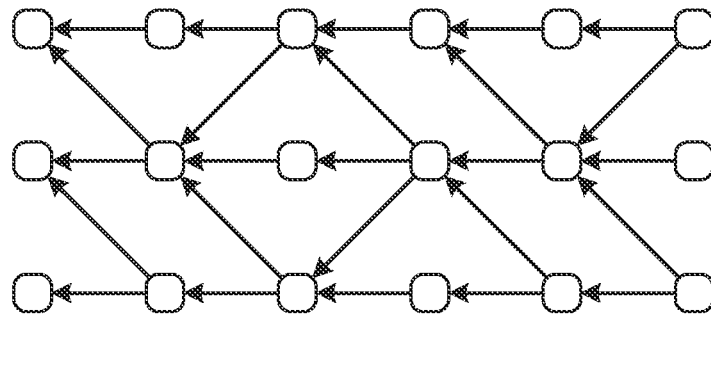

FIG. 7A and FIG. 7B illustrate directed graphs, i.e., one in which case every edge has just one direction, e.g., left to right (LTR) in FIG. 7A, and right to left (RTL) in FIG. 7B. These graphs do not contain cycles, which makes it possible to perform LSTM updates in a standard topological order from child to parent or vice-versa.

The PDF glyph adjacency graph shown in FIG. 3B is not a DAG or even a directed graph. That is, all edges between nodes are bidirectional, such as shown in FIG. 6. However, it can be converted into a forward DAG by selecting edges pointing right, such as shown in FIG. 7A, and can be converted into a backward DAG by selecting edges pointing left, as shown in FIG. 7B. This is entirely equivalent to forward and backward LSTMs, and the outputs can be concatenated to make a bidirectional LSTM for graphs.

Figure 8:
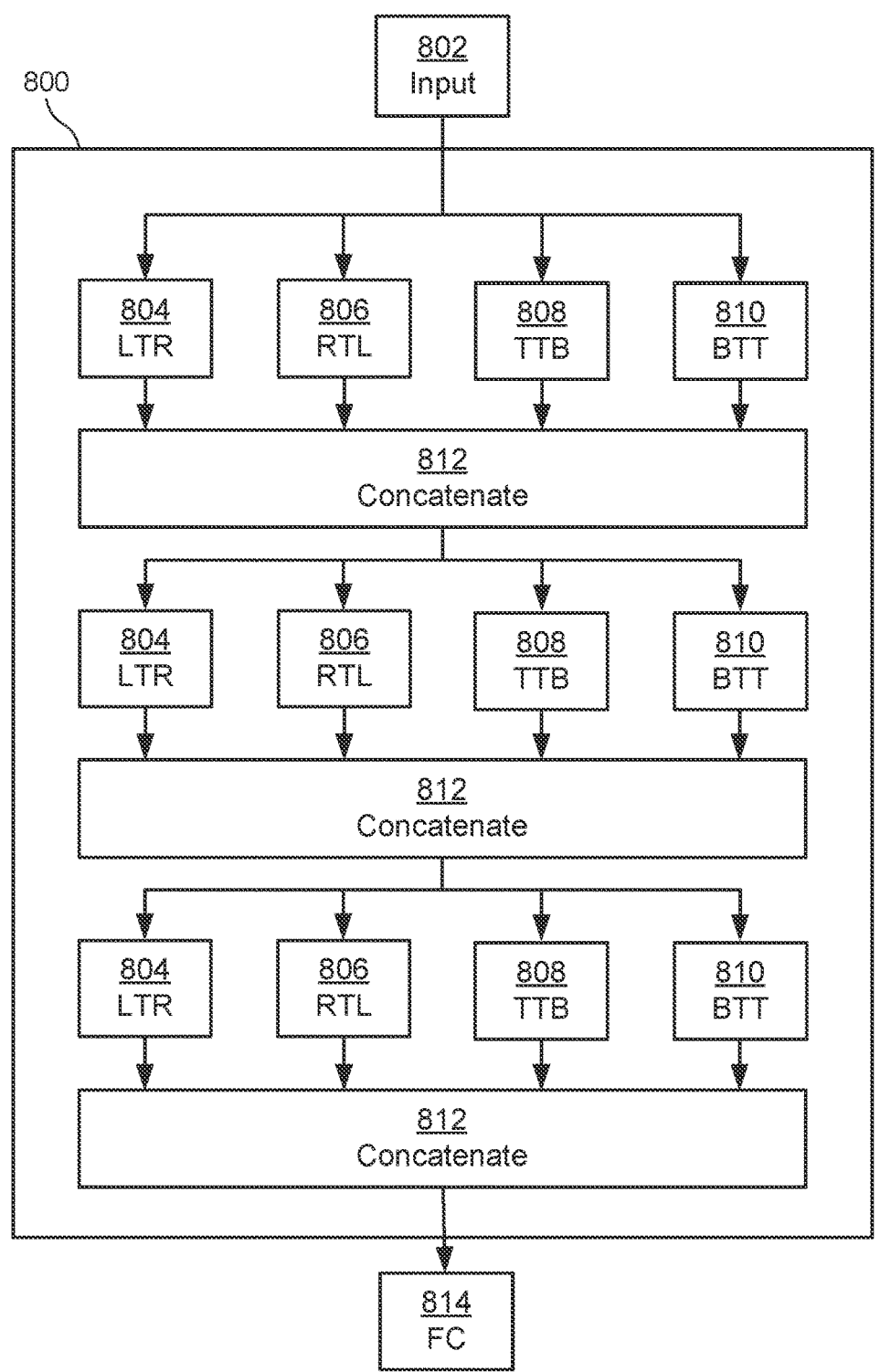
FIG. 8 illustrates a multi-level machine learning model for performing graph-based classification of text, according to aspects of the disclosure.

In some aspects, for PDFs, better performance is achieved by concatenating four directions of LSTMs, e.g., LTR, RTL, top-to-bottom (TTB), and bottom-to-top (BTT). This makes sense intuitively, since these correspond to the natural reading order of English (left-to-right, top-to-bottom) and its reverse. In some aspects, attentive DAG-LSTMs are stacked on top of each other to model more complex relationships. FIG. 8 shows an implementation using this technique.

FIG. 8 illustrates a multi-level machine learning model 800 for performing graph-based classification of text, according to aspects of the disclosure. In the example illustrated in FIG. 8, the model 800 takes as input 802 a glyph adjacency graph. This graph is processed by four separate directional LSTMs—LTR 804, RTL 806, TTB 808, and BTT 810—whose outputs are concatenated together in a concatenate operation 812. This set of operations—parallel processing of the input by four LSTMs of different directions followed by concatenation of the outputs—is repeated two more times, where the output of the final concatenation step is coupled to at least one fully connected output layer (FC) 814. For ease of description, the architecture of a multi-level ML model 800 may be described as "W×D", where width W is the number of different LSTMs used in each stage (and whose outputs are concatenated together before going to the next stage) and depth D is the number of stages. Thus, the multilevel ML model 800 illustrated in FIG. 8 is a "4×3" implementation, i.e., each stage uses four LSTMs with different directions (LTR, RTL, TTB, and BTT), and there are three "LSTM+concatenation" stages in series.

Figure 9:
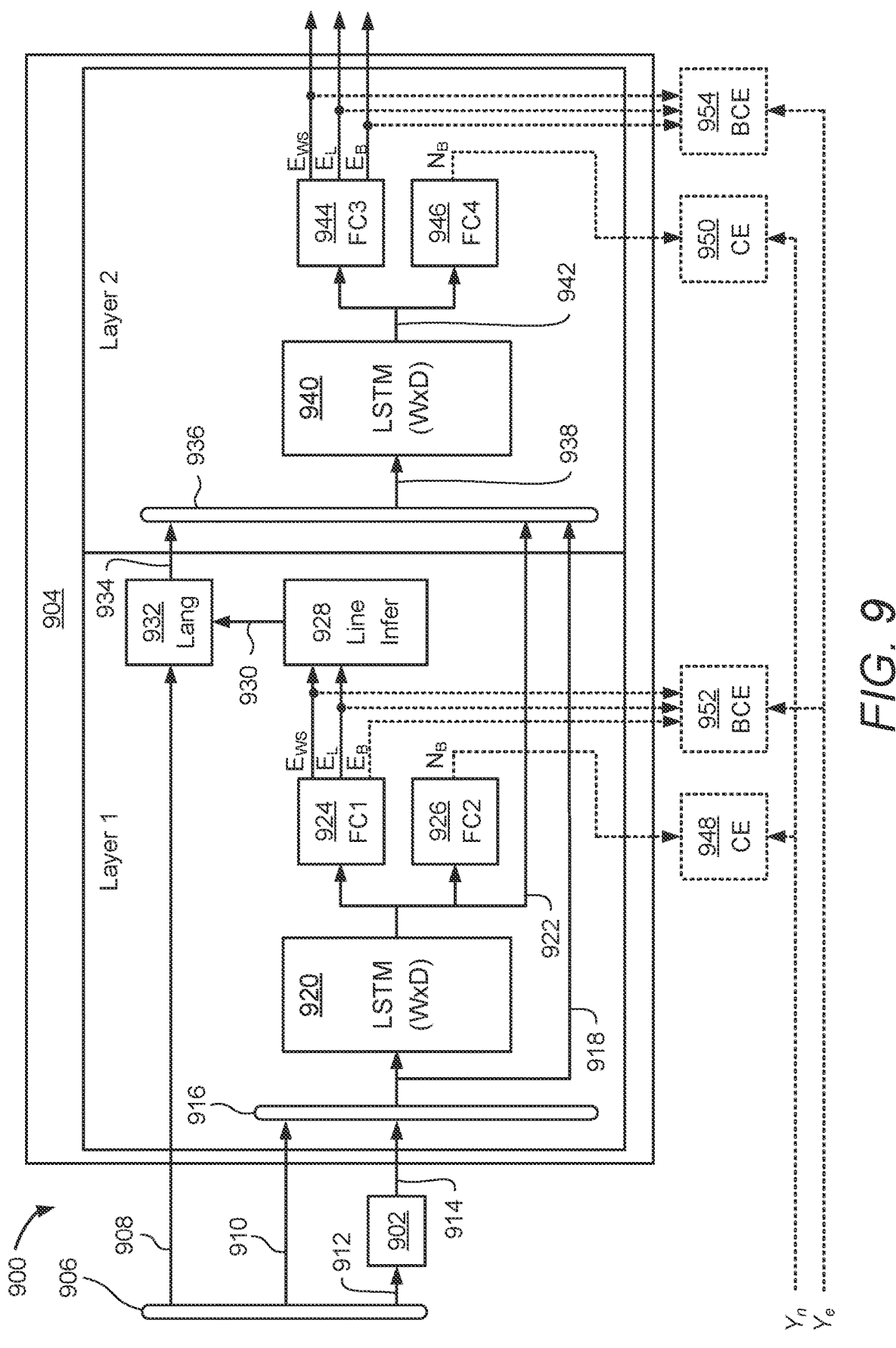
FIG. 9 is a system diagram illustrating a system for extracting text from unstructured documents, according to aspects of the disclosure.

FIG. 9 is a system diagram illustrating a system 900 for extracting text from unstructured documents, according to aspects of the disclosure. The system 900 includes a positional image embedder 902 (e.g., a modified UNet pixel classifier model) to provide additional information that is fed into self-organizing network (SON) 904. Rather than outputting the pixel classifications, however, the embedder 902 outputs the last hidden state, which comprises multi-dimensional embedding information.

In the example shown in FIG. 9, the input 906 into the system 900 comprises all information associated with each node in the graph, which includes glyph character information 908 (e.g., whether the glyph is a 'B', an '8', a ':', and so on), glyph general information 910 (e.g., glyph character information; typeface name as an embedding; font features, such as bold, italic, small capitals, etc.; XY coordinates of the glyph on the page; page number divided by the number of pages in the PDF; distance from top/bottom/left/right margins; etc.), and image data 912 (e.g., the pixel values). The image data 912 is provided to the embedder 902, which generates pixel multi-dimensional embedding information for every pixel in the PDF image. For every node (glyph) in the adjacency graph, node multi-dimensional embedding information 914 is calculated as the mean of the pixel embeddings over an n-by-n square centered on the node. The glyph position information 910 and the node multi-dimensional embedding information 914 are sent to the first layer of the multi-layer DAG-LSTM, where they are concatenated 916, and the concatenated data 918 is provided to a MD LSTM 920 as well as to the next layer of the multi-layer DAG-LSTM. In some aspects, the W×D LSTM 920 may have a width of four, e.g., one that includes a left-to-right DAG-LSTM, a right-to-left DAG-LSTM, a top-to-bottom DAG-LSTM, and a bottom-to-top DAG-LSTM, or some other width. In some aspects, the W×D LSTM 920 may have a depth of three or some other depth.

Thus, unlike conventional approaches that rely on pixel classification, the system 900 instead uses the multi-dimensional vectors of the last hidden layer as a richer set of additional inputs into the SON 904. In addition, the system 900 uses multiple layers, each layer utilizing multiple, parallel DAG-LSTMs. In contrast, conventional text extraction approaches are not based on 2-dimensional graphs, much less based on DAG-LSTMs.

In the example illustrated in FIG. 9, the output of the W×D LSTM 920 comprises the outputs of each of the W DAG-LSTMs at stage D concatenated together, and this concatenated data 922 is provided to two fully-connected (FC) dense networks: FC1 924 and FC2 926. FC1 924 includes three layers for edge classification and produces a prediction that an edge between two nodes (i.e., the gap between two glyphs) is part of whitespace ($E_{WS}$), part of a line ($E_L$), or part of a text block ($E_B$). FC2 926 includes a single layer for node (glyph) classification and classifies the node (glyph) as being part of a header, a footer, a title, the body text, or other categories.

In the example illustrated in FIG. 9, the values of $E_{WS}$ and $E_L$ are provided to a line inference block 928, e.g., via calculation of maximum path coverage. The line inference block 928 provides its output 930 to a language model 932, such as BERT, which is an open source machine learning framework for natural language processing (NLP). The language model 932 provides information 934 that indicates whether the words and lines have been parsed correctly by the line inference block 928 or not. This information 934, along with the concatenated data 922 from the W×D LSTM 920 and the concatenated data 918 comprising the data from the embedder 902 and the glyph general information 910, are all provided to the second layer of the multi-layer DAG-LSTM. There, they are concatenated 936, and the concatenated data 938 is provided to a second W×D LSTM 940. In the example illustrated in FIG. 9, both the first W×D LSTM 920 and the second MD LSTM 940 have a width W=4, and may also both have a depth D=3.

The additional information 934 provided by the NLP language model 932 is one of the features of the system 900 that allow the SON 904 to self-organize, e.g., to fine-tune itself to more accurately group nodes in the graph into words, group words into lines, and group lines into blocks, and/or to trigger regrouping of glyphs into words and lines according to a natural language model.

In the example illustrated in FIG. 9, the output of the second W×D LSTM 940 comprises the outputs of each of the W DAG-LSTMs at stage D concatenated together, and this concatenated data 942 is provided to two fully-connected (FC) dense networks: FC3 944 and FC4 946. FC3 944 includes three layers for edge classification of an edge as part of whitespace ($E_{WS}$), part of a line ($E_L$), and/or part of a text block ($E_B$). FC3 946 includes a single layer for node classification of a node as part of a text block ($N_B$).

In the example illustrated in FIG. 9, the output of the system 900 are the values of $E_{WS}$, $E_L$, and $E_B$. While FIG. 9 illustrates an SON 904 that comprises a multi-layer DAG-LSTM having just two layers, in other aspects, the multi-layer DAG-LSTM may have three or more layers, where the outputs of one layer are concatenated together and provided as an input to the next layer. For example, for a three-layer DAG-LSTM, in some aspects, each layer except the last would include all of the structures of layer 1 shown in FIG. 9, including a W×D LSTM, at least one FC, a line inference block, and a language model. Likewise, in some aspects, each layer except the first would receive as input the concatenation of (a) the input to the previous layer, (b) the output of the W×D LSTM of the previous layer, and (c) the output of the language module of the previous layer.

During training of the SON 904 using a known input 906, ground truth information about the nodes (Yn), e.g., node labels, channel labels, etc., is provided, along with $N_B$, to cross-entropy modules CE 948 and CE 950, and ground truth information about the edges (Ye), e.g., edge labels, block connections, line connections, whitespace, etc. is provided, along with $E_{WS}$, $E_L$, and $E_B$, to binary cross entropy modules BCE 952 and BCE 954. The outputs (not shown) of CE 948 and BCE 952 are error functions or distance functions, and are used to train the components within the first layer of the multi-layer DAG-LSTM, and the outputs (not shown) of CE 950 and BCE 954 are error functions or distance functions, and are used to train the components within the second layer of the multi-layer DAG-LSTM. In the example illustrated in FIG. 9, the data paths and functions shown in dashed lines are used only during training.

Thus, in the example illustrated in FIG. 9, the SON 904 comprises a multi-layer DAG-LSTM having two layers. The basis of a layer in the SON 904 is a multilayer attentive quadridirectional DAG-LSTM, which takes both node features and edge features as input. In each layer, the DAG-LSTM modules are stacked four layers deep, with the node and edge outputs of each layer being used as an input to subsequent layers. In the first layer, the multilayer quadridirectional attentive DAG-LSTM is given input features derived from the PDF (e.g., glyphs and glyph positions) as well as positional image embeddings derived from a positional image embedder. In subsequent SON layers, the multilayer quadridirectional attentive DAG-LSTM is given the node and edge hidden states of the previous layer, along with language model embeddings derived from the partially reconstructed text in the PDF. In each SON layer, a line inference model reconstructs the text lines using maximum value path cover (internally by reframing it as minimum value bipartite matching). The lines are then fed to a language model, which constructs embeddings for the line as a whole and for each token individually. These are concatenated to the hidden states for their corresponding nodes and added to the input state to the next layer.

In some aspects, the machine language framework for calculating maximum value path cover allows gradients to be propagated backwards through the line inference model for finer control, e.g., by indicating which element ($E_{WS}$, $E_L$, $E_B$, $N_B$, etc.) had the most weight and thus the most influence on an error function such as CE 948, BCE 952, and so on. Such networks support auto-differentiation.

Figure 10:
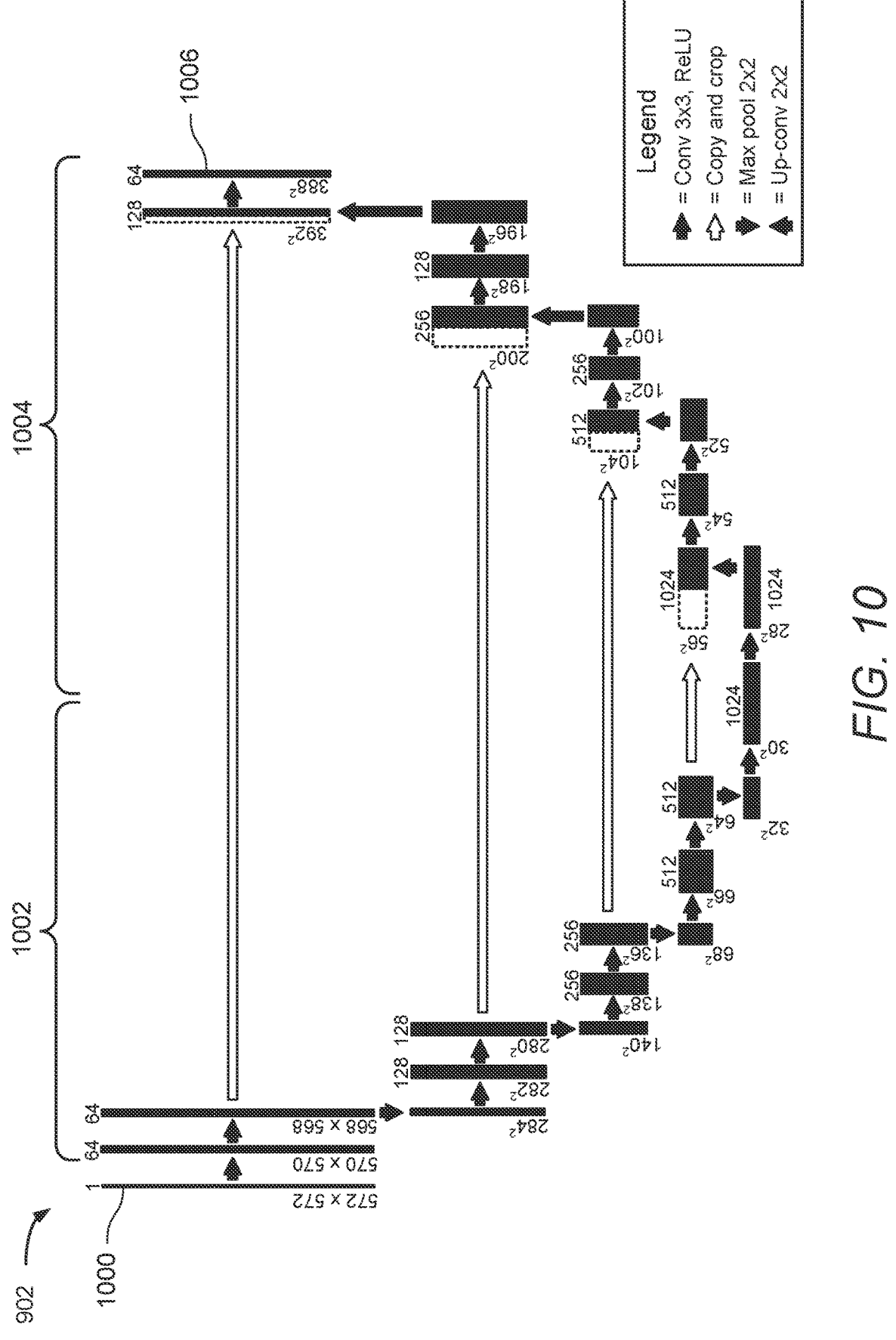
FIG. 10 shows an example of embedder according to aspects of the disclosure, in more detail.

FIG. 10 shows an example of embedder 902 according to aspects of the disclosure, in more detail. In the example illustrated in FIG. 10, the embedder 902 comprises a modified UNet model that uses an input image tile 1000 as an input, and uses a set of convolution and pooling steps 1002, followed by a set of up-conversion and convolution steps 1004. However, in contrast to the conventional approach, the classification layer in the UNet is removed, and the hidden state is extracted. (The same approach may be used with other models, such as ResNet.) Rather than outputting a segmentation map, the modified UNet model outputs the values of the last hidden layer 1006 (a 388×388×64 layer in FIG. 10), which yields a 64-dimensional embedding for every pixel in the PDF image. Then, for every node in the adjacency graph, the system 900 takes the mean of the embeddings over an n-by-n square centered on the node. This produces a 64-dimensional embedding for every node in the graph. This information is later concatenated to the input in graph-based learning models (e.g. graph convolutional or DAG-LSTM).

The use of a graph allows for classification of glyphs based not only on an analysis of glyphs as nodes but also based on analysis of edges between glyphs. Examples of edge analysis may include, but are not limited to, determining how glyphs should be grouped into words, lines, and blocks based on relative edge lengths, edge angles, edge location within a page, and other edge characteristics. These are examples of the kinds of information that be considered during segmentation, but the final analysis may be based on more of a big-picture view of the graph as a whole. For example, lines may be identified by looking for straight horizontal paths over the page, and columns may be identified by looking for straight vertical paths over the page. Thus, the techniques disclosed herein may look not only at individual edge characteristics, but also on how edges and nodes combine together over the entire page.

Word Segmentation as an Edge Classification Problem

Figure 11:
FIG. 11 shows an example output of a graph-based word segmentation process, according to aspects of the disclosure.

In some aspects, word segmentation can be treated as a classification task similar to line segmentation and/or block segmentation, e.g., by predicting edges that correspond to whitespace. This is yet another edge classification problem that can be solved using graph-based machine learning methods. In some aspects, word segmentation can be regularized by requiring that any whitespace edge must be internal to a line (and therefore also internal to a block). FIG. 11 illustrates the result of this process as applied to the graph shown in FIG. 3B.

FIG. 11 shows an example output of a graph-based word segmentation process, according to aspects of the disclosure. The contents of the PDF page shown in FIG. 3A has been successfully segmented into words, which are indicated in FIG. 11 as nodes (glyphs) connected by lines. In some aspects, the collections of lines that indicates individual words represent edges between glyphs that remain after edges that are characterized as white space have been removed from the starting graph.

Line Segmentation as an Edge Classification Problem

In some aspects, line segmentation can be partially solved by predicting which glyphs are adjacent to each other on a line, where adjacency refers to which letter (glyph) should logically follow another letter (glyph) as text is read. This is an edge classification problem that can be solved using graph-based machine learning methods. Given a set of calculated probabilities for each edge, it is possible to find the optimal assignment of lines in E by taking the maximum value path cover over (V,E) where weights to edges in E are according to logarithmic probabilities. In some aspects, this can be achieved efficiently using methods such as maximum value bipartite matching or linear sum assignment.

Figure 12:
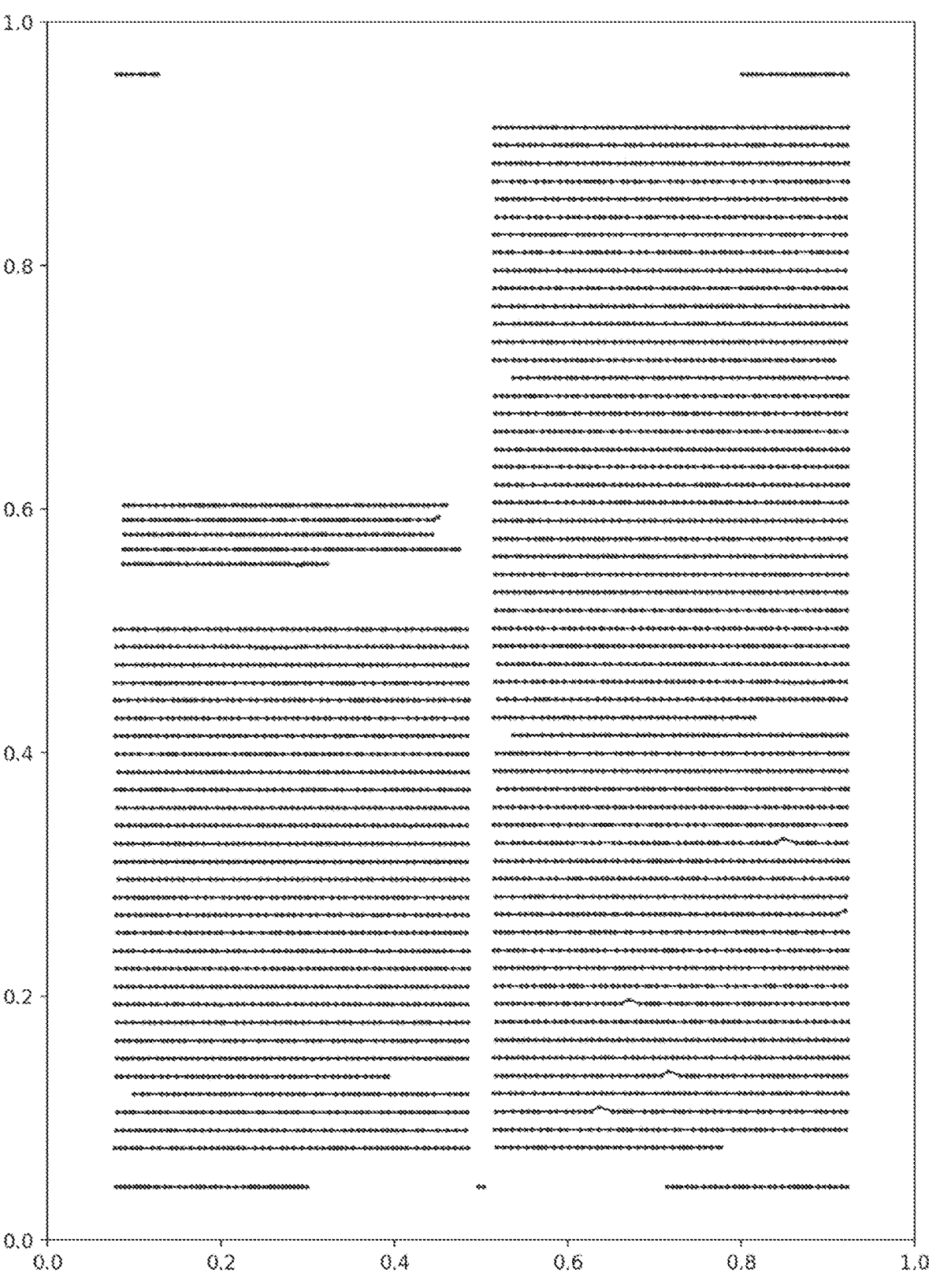
FIG. 12 shows an example output of a graph-based line segmentation process, according to aspects of the disclosure.

In some aspects, line segmentation may be performed by the following steps. Let a directed acyclic graph $G_{DAG}=(V_{DAG}, E_{DAG})$ be any acyclic orientation of G. Then let $V_o$ be the set of nodes in $V_{DAG}$ which are out-nodes to any edge in $E_{DAG}$, and $V_i$ be the set of nodes in $V_{DAG}$ which are in-nodes to any edge in $E_{DAG}$. Now, $G_B=(V_o, V_i, E_{DAG})$ is a bipartite graph, and the maximum value path cover in G is given by the maximum value bipartite matching of Ga. In some cases, this may yield spurious edges, but in some aspects, these spurious edges may be removed by requiring that every output edge has a probability greater than 0.5. In some aspects, regularization may be by maximum path cover and/or minimum weight bipartite matching. FIG. 12 illustrates the result of this process as applied to the graph shown in FIG. 3B.

FIG. 12 shows an example output of a graph-based line segmentation process, according to aspects of the disclosure. The contents of the PDF page shown in FIG. 3A has been successfully segmented into lines, which are indicated in FIG. 12 as nodes (glyphs) connected by lines. In some aspects, the lines represent edges between glyphs that remain after edges that are not characterized as "line-internal" have been removed from the starting graph.

Block Segmentation as an Edge Classification Problem

Figure 13:
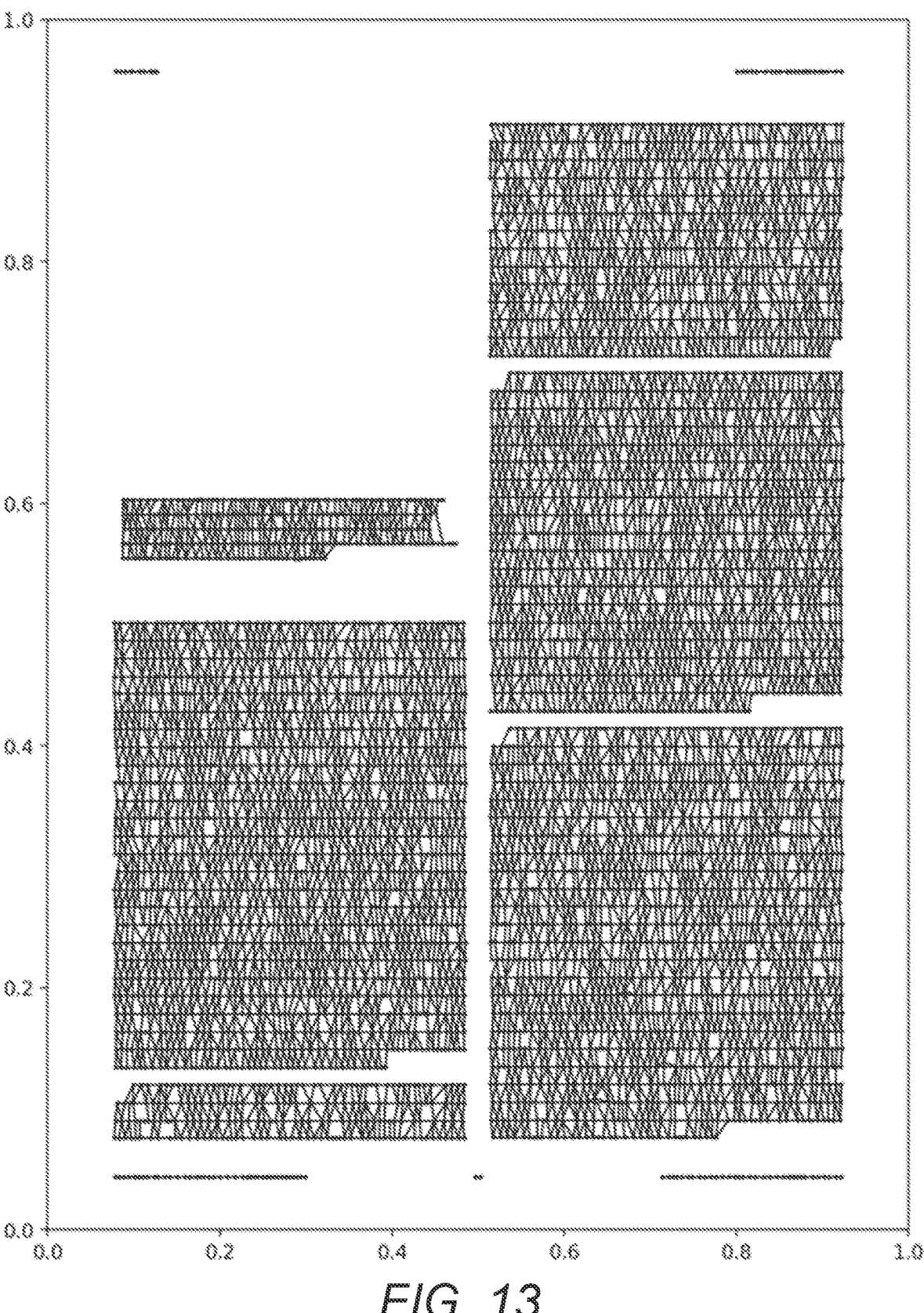
FIG. 13 shows an example output of a graph-based block segmentation process, according to aspects of the disclosure.

In some aspects, block segmentation can be partially solved by predicting the probability that any edge in the adjacency graph belongs to the same block. This is another edge classification problem that can be solved using graph-based machine learning methods. In some aspects, regularization may be by jointly training semantic segmentation and block segmentation, or by maximum path cover/minimum weight bipartite matching. FIG. 13 illustrates the result of this process as applied to the graph shown in FIG. 3B.

FIG. 13 shows an example output of a graph-based block segmentation process, according to aspects of the disclosure. The contents of the PDF page shown in FIG. 3A has been successfully segmented into blocks, which are indicated in FIG. 13 as nodes (glyphs) connected by lines. In some aspects, the collections of lines within the blocks represent edges between glyphs that remain after edges that are not characterized as "block-internal" have been removed from the starting graph.

Figure 14:
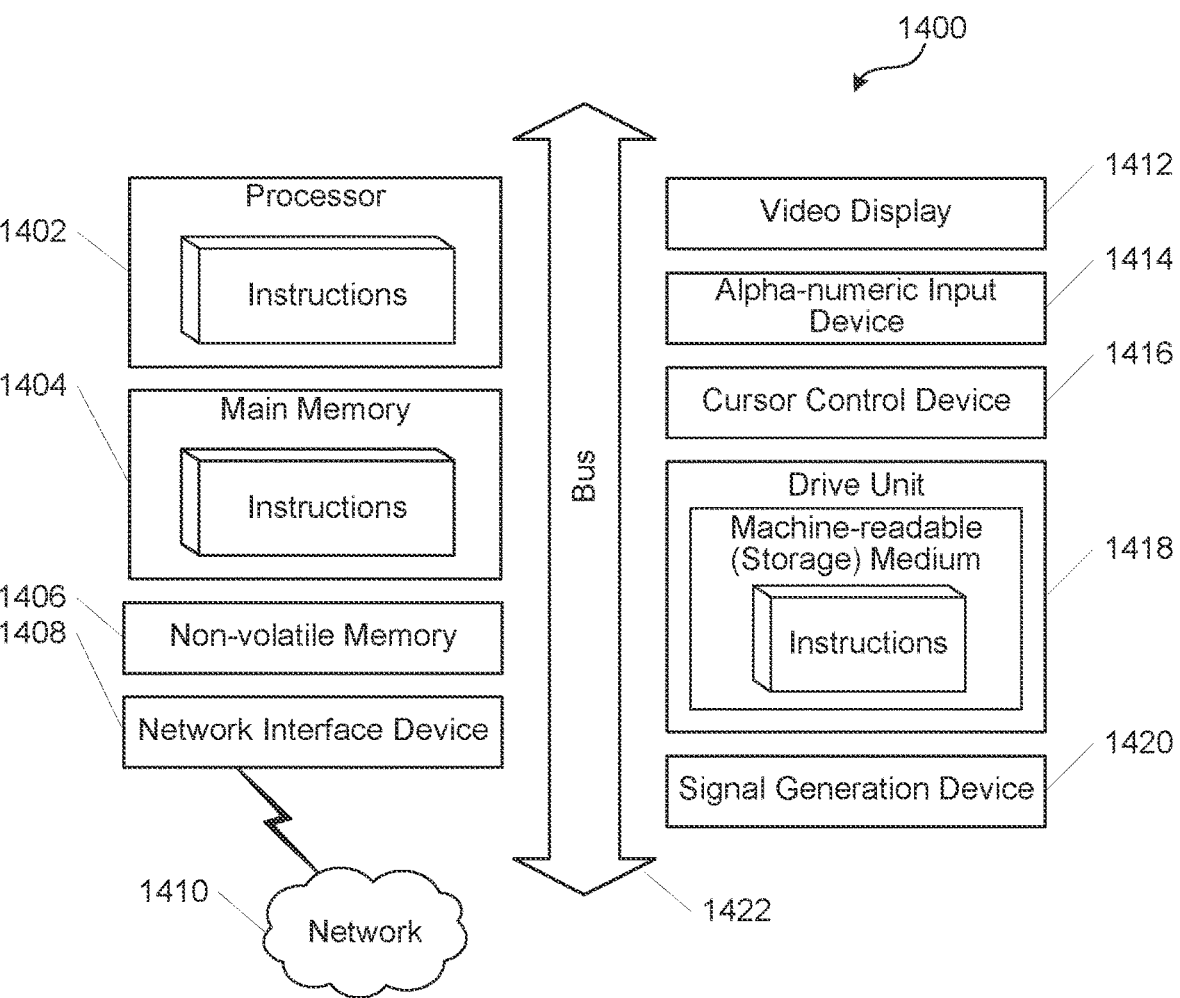
FIG. 14 shows an example apparatus for performing graph-based text-extraction from unstructured documents, according to aspects of the disclosure.

FIG. 14 shows an example apparatus for performing graph-based text-extraction from unstructured documents, according to aspects of the disclosure. FIG. 14 shows a diagrammatic representation of a machine in the example form of a computer system within which a set of instructions, for causing the machine to perform any one or more of the methodologies discussed herein, may be executed.

In the example of FIG. 14, the computer system 1400 includes a processor 1402, main memory 1404, non-volatile memory 1406, and an interface device 1408 for connecting to a network 1410. System 1400 may include a video display 1412, an alpha-numeric input device 1414, such as a keyboard or touch screen, a cursor control device 1416, such as a mouse, trackpad, touchpad, or touch screen, and a non-volatile mass data storage device 1418, such as a hard disk drive, solid state drive, etc. System 1400 may include a signal generation device 1420, such as a speaker or microphone. Memory 1404 is coupled to processor 1402 by, for example, a bus 1422. System 1400 can receive an unstructured document as input and generate a text flow as output. An interface, such as network interface device 1408 or other interface may be used for receiving the unstructured document and/or outputting the generated text flow. System 1400 may include a database for storing information for later query during execution of the methods described herein and/or for storing the generated text flow.

Various common components (e.g., cache memory) are omitted for illustrative simplicity. The computer system 1400 is intended to illustrate a hardware device on which any of the components depicted in figures or described in this specification can be implemented. The computer system 1400 can be of any applicable known or convenient type. The components of the computer system 1400 can be coupled together via a bus or through some other known or convenient device.

FIG. 15 is a flowchart of an example graph-based process 1500 associated with methods and systems for text extraction from unstructured documents, according to aspects of the disclosure. In some implementations, one or more process blocks of FIG. 15 may be performed by an apparatus (e.g., computer system 1400). In some implementations, one or more process blocks of FIG. 15 may be performed by another device or a group of devices separate from or including the apparatus. Additionally, or alternatively, one or more process blocks of FIG. 15 may be performed by one or more components of an apparatus, such as a processor(s), memory, or transceiver(s), any or all of which may be means for performing the operations of process 1500.

As shown in FIG. 15, process 1500 may include, at block 1510, receiving a page of an unstructured document. Means for performing the operation of block 1510 may include the processor, memory, or other component(s) of computer system 1400. For example, the computer system 1400 may receive a page of an unstructured document from the network 1410 and store it in the main memory 1404.

As further shown in FIG. 15, process 1500 may include, at block 1520, extracting, from the page, a glyph identifier and a glyph position for each glyph on the page. Means for performing the operation of block 1520 may include the processor, memory, or other component(s) of computer system 1400. For example, the computer system 1400 may extract, from the page, a glyph identifier and a glyph position for each glyph on the page, using the processor 1402 and memory 1404.

As further shown in FIG. 15, process 1500 may include, at block 1530, generating an adjacency graph based on the glyph positions for each glyph on the page, each node in the graph corresponding to a glyph and comprising glyph information that includes at least the glyph identifier and the glyph position for the respective glyph. Means for performing the operation of block 1530 may include the processor, memory, or other component(s) of computer system 1400.

For example, the computer system 1400 may generate an adjacency graph using the processor 1402 and memory 1404.

As further shown in FIG. 15, process 1500 may include, at block 1540, processing the adjacency graph by a machine learning model to classify edges and nodes in the adjacency graph. Means for performing the operation of block 1540 may include the processor, memory, or other component(s) of computer system 1400. For example, the computer system 1400 may process the adjacency graph by a machine learning model executed by the processor 1402 and stored in memory 1404.

As further shown in FIG. 15, process 1500 may include, at block 1550, grouping the glyphs according to their edge and node classifications to produce text output. Means for performing the operation of block 1550 may include the processor, memory, or other component(s) of computer system 1400. For example, the computer system 1400 may group the glyphs according to their edge and node classifications to produce text output, using the processor 1402 and memory 1404.

In some aspects, generating the adjacency graph based on the glyph positions for each glyph on the page comprises generating the adjacency graph using a spatial index that stores spatial information for each glyph on the page.

In some aspects, processing the adjacency graph by the machine learning model comprises processing the adjacency graph by a self-organizing network (SON) having at least one layer, wherein each layer processes the adjacency graph by at least one directed acyclic graph long short-term memory neural network (DAG-LSTM) in the direction that the DAG-LSTM was trained, and processes the output of the at least one DAG-LSTM by at least one fully-connected output layer to classify edges and nodes in the adjacency graph.

In some aspects, processing the adjacency graph by a SON having at least one layer comprises processing the adjacency graph by a SON having a plurality of layers in series, wherein an output of each layer is an input into a subsequent layer and wherein the input to a first layer is also an input to each subsequent layer.

In some aspects, processing the adjacency graph by the at least one DAG-LSTM comprises processing the adjacency graph by a plurality of DAG-LSTMs, each DAG-LSTM in the plurality of DAG-LSTMs being trained in a different direction from another DAG-LSTM in the plurality of DAG-LSTMs and each DAG-LSTM processing the adjacency graph in the direction in which the respective DAG-LSTM was trained.

In some aspects, processing the output of the at least one DAG-LSTM by the at least one fully-connected layer comprises processing a concatenated output of the plurality of DAG-LSTMs by the at least one fully-connected layer.

In some aspects, processing the output of the at least one DAG-LSTM by at least one fully-connected output layer comprises processing the output of the at least one DAG-LSTM by a first fully connected output layer for classifying edges and by a second fully connected output layer for classifying nodes.

In some aspects, processing the output of the at least one DAG-LSTM by at least one fully-connected output layer further comprises processing at least some of the output of the at least one fully-connected output layer by a line inference block, processing the output of the line inference block by a natural language processing model, and grouping or regrouping the glyphs according to their edge and node classifications to produce text output according to the output of the natural language processing model.

In some aspects, process 1500 includes extracting, from the page, a bitmap image of the page, processing the bitmap image of the page to generate a multi-dimensional pixel embedding for every pixel in the bitmap image, and generating a multi-dimensional glyph embedding for each glyph on the page, based the multi-dimensional pixel embeddings of pixels in an area centered around the glyph, wherein processing the adjacency graph by the machine learning model comprises processing the adjacency graph concatenated with the multi-dimensional glyph embedding for each glyph on the page by the machine learning model.

In some aspects, processing the bitmap image of the page to generate a multi-dimensional pixel embedding for every pixel in the bitmap image comprises processing the bitmap image by a neural network that outputs the values of the last hidden layer as the multi-dimensional pixel embedding for every pixel in the bitmap image.

Process 1500 may include additional implementations, such as any single implementation or any combination of implementations described below and/or in connection with one or more other processes described elsewhere herein. Although FIG. 15 shows example blocks of process 1500, in some implementations, process 1500 may include additional blocks, fewer blocks, different blocks, or differently arranged blocks than those depicted in FIG. 15. Additionally, or alternatively, two or more of the blocks of process 1500 may be performed in parallel.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method for extracting text from unstructured documents, the method comprising: receiving a page of an unstructured document; extracting, from the page, a glyph identifier and a glyph position for each glyph on the page; generating an adjacency graph based on the glyph positions for each glyph on the page, each node in the adjacency graph corresponding to a glyph and comprising glyph information that includes at least the glyph identifier and the glyph position for the respective glyph; processing the adjacency graph by a machine learning model to classify edges and nodes in the adjacency graph; and grouping the glyphs according to their edge and node classifications to produce text output.

Clause 2. The method of clause 1, wherein generating the adjacency graph based on the glyph positions for each glyph on the page comprises generating the adjacency graph using a spatial index that stores spatial information for each glyph on the page.

Clause 3. The method of any of clauses 1 to 2, wherein processing the adjacency graph by the machine learning model comprises processing the adjacency graph by a self-organizing network (SON) having at least one layer, wherein each layer processes the adjacency graph by at least one directed acyclic graph long short-term memory neural network (DAG-LSTM), and processing the output of the at least one DAG-LSTM by at least one fully-connected output layer to classify edges and nodes in the adjacency graph.

Clause 4. The method of clause 3, wherein processing the adjacency graph by a SON having at least one layer comprises processing the adjacency graph by a SON having a plurality of layers in series, wherein an output of each layer is an input into a subsequent layer and wherein the input to a first layer is also an input to each subsequent layer.

Clause 5. The method of any of clauses 3 to 4, wherein processing the adjacency graph by the at least one DAG-LSTM comprises processing the adjacency graph by a plurality of DAG-LSTMs, each DAG-LSTM in the plurality of DAG-LSTMs being trained in a different direction from another DAG-LSTM in the plurality of DAG-LSTMs.

Clause 6. The method of clause 5, wherein processing the output of the at least one DAG-LSTM by the at least one fully-connected layer comprises processing a concatenated output of the plurality of DAG-LSTMs by the at least one fully-connected layer.

Clause 7. The method of any of clauses 3 to 6, wherein processing the output of the at least one DAG-LSTM by at least one fully-connected output layer comprises processing the output of the at least one DAG-LSTM by a first fully connected output layer for classifying edges and by a second fully connected output layer for classifying nodes.

Clause 8. The method of any of clauses 3 to 7, wherein processing the output of the at least one DAG-LSTM by at least one fully-connected output layer further comprises: processing at least some of the output of the at least one fully-connected output layer by a line inference block; processing the output of the line inference block by a natural language processing model; and grouping or regrouping the glyphs according to their edge and node classifications to produce text output according to the output of the natural language processing model.

Clause 9. The method of any of clauses 1 to 8, further comprising: extracting, from the page, a bitmap image of the page; processing the bitmap image of the page to generate a multi-dimensional pixel embedding for every pixel in the bitmap image; and generating a multi-dimensional glyph embedding for each glyph on the page, based the multi-dimensional pixel embeddings of pixels in an area centered around the glyph; wherein processing the adjacency graph by the machine learning model comprises processing the adjacency graph concatenated with the multi-dimensional glyph embedding for each glyph on the page by the machine learning model.

Clause 10. The method of clause 9, wherein processing the bitmap image of the page to generate a multi-dimensional pixel embedding for every pixel in the bitmap image comprises processing the bitmap image by a neural network that outputs values of a hidden layer as the multi-dimensional pixel embedding for every pixel in the bitmap image.

Clause 11. An apparatus, comprising: a memory; and at least one processor communicatively coupled to the memory, the at least one processor configured to: receive a page of an unstructured document; extract, from the page, a glyph identifier and a glyph position for each glyph on the page; generate an adjacency graph based on the glyph positions for each glyph on the page, each node in the adjacency graph corresponding to a glyph and comprising glyph information that includes at least the glyph identifier and the glyph position for the respective glyph; process the adjacency graph by a machine learning model to classify edges and nodes in the adjacency graph; and group the glyphs according to their edge and node classifications to produce text output.

Clause 12. The apparatus of clause 11, wherein, to generate the adjacency graph based on the glyph positions for each glyph on the page, the at least one processor is configured to generate the adjacency graph using a spatial index that stores spatial information for each glyph on the page.

Clause 13. The apparatus of any of clauses 11 to 12, wherein, to process the adjacency graph by the machine learning model, the at least one processor is configured to process the adjacency graph by a self-organizing network (SON) having at least one layer, wherein each layer processes the adjacency graph by at least one directed acyclic graph long short-term memory neural network (DAG-LSTM), and to process the output of the at least one DAG-LSTM by at least one fully-connected output layer to classify edges and nodes in the adjacency graph.

Clause 14. The apparatus of clause 13, wherein the SON comprises a plurality of layers in series, wherein an output of each layer is an input into a subsequent layer and wherein the input to a first layer is also an input to each subsequent layer.

Clause 15. The apparatus of any of clauses 13 to 14, wherein, to process the adjacency graph by the at least one DAG-LSTM, the at least one processor is configured to process the adjacency graph by a plurality of DAG-LSTMs, each DAG-LSTM in the plurality of DAG-LSTMs being trained in a different direction from another DAG-LSTM in the plurality of DAG-LSTMs.

Clause 16. The apparatus of clause 15, wherein, to process the output of the at least one DAG-LSTM by the at least one fully-connected layer, the at least one processor is configured to process a concatenated output of the plurality of DAG-LSTMs by the at least one fully-connected layer.

Clause 17. The apparatus of any of clauses 13 to 16, wherein, to process the output of the at least one DAG-LSTM by at least one fully-connected output layer, the at least one processor is configured to process the output of the at least one DAG-LSTM by a first fully connected output layer for classifying edges and by a second fully connected output layer for classifying nodes.

Clause 18. The apparatus of any of clauses 13 to 17, wherein, to process the output of the at least one DAG-LSTM by at least one fully-connected output layer, the at least one processor is configured to: process at least some of the output of the at least one fully-connected output layer by a line inference block; process the output of the line inference block by a natural language processing model; and group or regrouping the glyphs according to their edge and node classifications to produce text output according to the output of the natural language processing model.

Clause 19. The apparatus of any of clauses 11 to 18, wherein the at least one processor is further configured to: extract, from the page, a bitmap image of the page; process the bitmap image of the page to generate a multi-dimensional pixel embedding for every pixel in the bitmap image; and generate a multi-dimensional glyph embedding for each glyph on the page, based the multi-dimensional pixel embeddings of pixels in an area centered around the glyph, wherein, to process the adjacency graph by the machine learning model, the at least one processor is configured to process the adjacency graph concatenated with the multi-dimensional glyph embedding for each glyph on the page by the machine learning model.

Clause 20. The apparatus of clause 19, wherein processing the bitmap image of the page to generate a multi-dimensional pixel embedding for every pixel in the bitmap image comprises processing the bitmap image by a neural network that outputs values of a hidden layer as the multi-dimensional pixel embedding for every pixel in the bitmap image.

Clause 21. An apparatus comprising a memory, a transceiver, and a processor communicatively coupled to the memory and the transceiver, the memory, the transceiver, and the processor configured to perform a method according to any of clauses 1 to 10.

Clause 22. An apparatus comprising means for performing a method according to any of clauses 1 to 10.

Clause 23. A non-transitory computer-readable medium storing computer-executable instructions, the computer-executable comprising at least one instruction for causing a computer or processor to perform a method according to any of clauses 1 to 10.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, circuitry, computer software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for extracting text from unstructured documents, the method comprising:

receiving a page of an unstructured document;

extracting, from the page, a glyph identifier and a glyph position for each glyph on the page;

generating an adjacency graph based on the glyph positions for each glyph on the page, each node in the adjacency graph corresponding to a glyph and comprising glyph information that includes at least the glyph identifier and the glyph position for the respective glyph;

processing the adjacency graph by a machine learning model to classify edges and nodes in the adjacency graph; and grouping the glyphs according to their edge and node classifications to produce text output.

2. The method of claim 1, wherein generating the adjacency graph based on the glyph positions for each glyph on the page comprises generating the adjacency graph using a spatial index that stores spatial information for each glyph on the page.

3. The method of claim 1, wherein processing the adjacency graph by the machine learning model comprises processing the adjacency graph by a self-organizing network (SON) having at least one layer, wherein each layer processes the adjacency graph by at least one directed acyclic graph long short-term memory neural network (DAG-LSTM), and processing an output of the at least one DAG-LSTM by at least one fully-connected output layer to classify edges and nodes in the adjacency graph.

4. The method of claim 3, wherein processing the adjacency graph by a SON having at least one layer comprises processing the adjacency graph by a SON having a plurality of layers in series, wherein an output of each layer is an input into a subsequent layer and wherein the input to a first layer is also an input to each subsequent layer.

5. The method of claim 3, wherein processing the adjacency graph by the at least one DAG-LSTM comprises processing the adjacency graph by a plurality of DAG-LSTMs, each DAG-LSTM in the plurality of DAG-LSTMs being trained in a different direction from another DAG-LSTM in the plurality of DAG-LSTMs.

6. The method of claim 5, wherein processing the output of the at least one DAG-LSTM by the at least one fully-connected layer comprises processing a concatenated output of the plurality of DAG-LSTMs by the at least one fully-connected layer.

7. The method of claim 3, wherein processing the output of the at least one DAG-LSTM by at least one fully-connected output layer comprises processing the output of the at least one DAG-LSTM by a first fully connected output layer for classifying edges and by a second fully connected output layer for classifying nodes.

8. The method of claim 3, wherein processing the output of the at least one DAG-LSTM by at least one fully-connected output layer further comprises:

processing at least some of the output of the at least one fully-connected output layer by a line inference block;

processing the output of the line inference block by a natural language processing model; and grouping or regrouping the glyphs according to their edge and node classifications to produce text output according to the output of the natural language processing model.

9. The method of claim 1, further comprising:

extracting, from the page, a bitmap image of the page;

processing the bitmap image of the page to generate a multi-dimensional pixel embedding for every pixel in the bitmap image; and generating a multi-dimensional glyph embedding for each glyph on the page, based the multi-dimensional pixel embeddings of pixels in an area centered around the glyph, wherein processing the adjacency graph by the machine learning model comprises processing the adjacency graph concatenated with the multi-dimensional glyph embedding for each glyph on the page by the machine learning model.

10. The method of claim 9, wherein processing the bitmap image of the page to generate a multi-dimensional pixel embedding for every pixel in the bitmap image comprises processing the bitmap image by a neural network that outputs values of a hidden layer as the multi-dimensional pixel embedding for every pixel in the bitmap image.

11. An apparatus, comprising:

a memory; and at least one processor communicatively coupled to the memory, the at least one processor configured to:

receive a page of an unstructured document;

extract, from the page, a glyph identifier and a glyph position for each glyph on the page;

generate an adjacency graph based on the glyph positions for each glyph on the page, each node in the adjacency graph corresponding to a glyph and comprising glyph information that includes at least the glyph identifier and the glyph position for the respective glyph;

process the adjacency graph by a machine learning model to classify edges and nodes in the adjacency graph; and group the glyphs according to their edge and node classifications to produce text output.

12. The apparatus of claim 11, wherein, to generate the adjacency graph based on the glyph positions for each glyph on the page, the at least one processor is configured to generate the adjacency graph using a spatial index that stores spatial information for each glyph on the page.

13. The apparatus of claim 11, wherein, to process the adjacency graph by the machine learning model, the at least one processor is configured to process the adjacency graph by a self-organizing network (SON) having at least one layer, wherein each layer processes the adjacency graph by at least one directed acyclic graph long short-term memory neural network (DAG-LSTM), and to process the output of the at least one DAG-LSTM by at least one fully-connected output layer to classify edges and nodes in the adjacency graph.

14. The apparatus of claim 13, wherein the SON comprises a plurality of layers in series, wherein an output of each layer is an input into a subsequent layer and wherein the input to a first layer is also an input to each subsequent layer.

15. The apparatus of claim 13, wherein, to process the adjacency graph by the at least one DAG-LSTM, the at least one processor is configured to process the adjacency graph by a plurality of DAG-LSTMs, each DAG-LSTM in the plurality of DAG-LSTMs being trained in a different direction from another DAG-LSTM in the plurality of DAG-LSTMs.

16. The apparatus of claim 15, wherein, to process the output of the at least one DAG-LSTM by the at least one fully-connected layer, the at least one processor is configured to process a concatenated output of the plurality of DAG-LSTMs by the at least one fully-connected layer.

17. The apparatus of claim 13, wherein, to process the output of the at least one DAG-LSTM by at least one fully-connected output layer, the at least one processor is configured to process the output of the at least one DAG-LSTM by a first fully connected output layer for classifying edges and by a second fully connected output layer for classifying nodes.

18. The apparatus of claim 13, wherein, to process the output of the at least one DAG-LSTM by at least one fully-connected output layer, the at least one processor is configured to:

process at least some of the output of the at least one fully-connected output layer by a line inference block;

process the output of the line inference block by a natural language processing model; and group or regrouping the glyphs according to their edge and node classifications to produce text output according to the output of the natural language processing model.

19. The apparatus of claim 11, wherein the at least one processor is further configured to:

extract, from the page, a bitmap image of the page;

process the bitmap image of the page to generate a multi-dimensional pixel embedding for every pixel in the bitmap image; and generate a multi-dimensional glyph embedding for each glyph on the page, based the multi-dimensional pixel embeddings of pixels in an area centered around the glyph, wherein, to process the adjacency graph by the machine learning model, the at least one processor is configured to process the adjacency graph concatenated with the multi-dimensional glyph embedding for each glyph on the page by the machine learning model.

20. The apparatus of claim 19, wherein processing the bitmap image of the page to generate a multi-dimensional pixel embedding for every pixel in the bitmap image comprises processing the bitmap image by a neural network that outputs values of a hidden layer as the multi-dimensional pixel embedding for every pixel in the bitmap image.

* * * * *